United States Patent
Senan et al.

(10) Patent No.: US 8,538,797 B2
(45) Date of Patent: Sep. 17, 2013

(54) SYSTEMS AND METHODS FOR INTEGRATING BUSINESS PROCESSES

(75) Inventors: Sunil Senan, Bangalore (IN); Kunal Gangakhedkar, Pune (IN); Abhishek, Bangalore (IN); Rakesh Mishra, Uttar Pradesh (IN)

(73) Assignee: Infosys Limited, Bangalore (IN)

( * ) Notice: Subject to any disclaimer, the term of this patent is extended or adjusted under 35 U.S.C. 154(b) by 1552 days.

(21) Appl. No.: 11/466,086

(22) Filed: Aug. 21, 2006

(65) Prior Publication Data

US 2007/0043724 A1 Feb. 22, 2007

(30) Foreign Application Priority Data

Aug. 22, 2005 (IN) .............................. 1165/CHE/2005

(51) Int. Cl.
*G06F 17/30* (2006.01)
(52) U.S. Cl.
USPC .......................................... 705/7.37; 705/7.38
(58) Field of Classification Search
USPC .................... 705/7, 7.11, 7.37, 7.38
See application file for complete search history.

(56) References Cited

U.S. PATENT DOCUMENTS

| | | | |
|---|---|---|---|
| 6,601,233 B1* | 7/2003 | Underwood | 717/102 |
| 2004/0138932 A1* | 7/2004 | Johnson et al. | 705/7 |
| 2004/0143470 A1* | 7/2004 | Myrick et al. | 705/7 |
| 2005/0080609 A1* | 4/2005 | Bhaskaran et al. | 703/22 |
| 2005/0091093 A1* | 4/2005 | Bhaskaran et al. | 705/7 |
| 2006/0074725 A1* | 4/2006 | Huang et al. | 705/7 |
| 2007/0043724 A1* | 2/2007 | Senan et al. | 707/8 |
| 2007/0276674 A1* | 11/2007 | Hemmat | 705/1 |

OTHER PUBLICATIONS

EAI for CIOs: A Pragmatic approach—by Suni Sesan Reusabilioty and decoupling enterprise architecture is the key Oct. 2004.*
Senan, "EAI for CIOs: A Pragmatic approach" SETLabs Briefings, 2003, 9 pages.
Senan et al., "Realizing the business value of EAI," Jan. 2005, 8 pages.
Mishra et al., "Securing Value From EAI Investments," SETLabs Briefings, vol. 3, No. 3, Jul.-Sep. 2005, 9 pages.

* cited by examiner

*Primary Examiner* — Andre Boyce
*Assistant Examiner* — Ernest A Jackson
(74) *Attorney, Agent, or Firm* — Klarquist Sparkman, LLP

(57) ABSTRACT

A system can create and manage a framework for integrating a plurality of business processes. The system can include a first tier module adapted for managing at least one internal function and at least one service of the plurality of business processes, wherein the business processes include respective predefined goals and objectives. The system can further include a second tier module adapted for managing business initiative solutions and establishing a capability to deploy and manage infrastructure based on the at least one function and at least one service of the plurality of business processes. Furthermore, the system can include a third tier module adapted for establishing an architecture according to the predefined goals and objectives of the plurality of business processes and an integration module adapted for linking the first tier module, the second tier module, the third tier module, or combinations thereof for creating and managing the framework.

14 Claims, 4 Drawing Sheets

SYSTEMS AND METHODS FOR INTEGRATING BUSINESS PROCESSES

BACKGROUND

A business process is an ordered series of business events, which manage exchange of information from one or more sources to one or more destinations under control of structured business rules that govern the purpose of the business process. Such sources and destinations may be internal, customer, or partner applications, applied to control how the change and exchange of information is accomplished. Likewise, the business process will have various sub-processes representing unit business services that may or may not be reusable across various business processes. These business processes, together with the sub-processes, make the business system highly robust and complicated.

In a typical business system having multiple business processes across various geographical locations, integration of these business processes becomes essential to the business automation efficiency and productivity. Conventionally, business processes across various business systems have been standardized to facilitate the integration. However, there are problems related to this sort of standardization.

First, the standardization strategies are not aligned to the business goals and objectives and information technology strategies, thereby creating a gap in the delivered business benefit. Second, non-aligned business processes may create potential points of failure in the information technology architecture leading to frequent non-availability of applications and loss of functioning of one or more business processes. Third, the conventional methods of integration are highly complex and expensive, especially when integrating more than one business system component. Fourthly, the conventional methods of integration are not dynamic and are not adapted for any modification during any change of business processes, resulting in impact on time-to-market performance of the business process change.

Accordingly, there is a need for techniques of integrating various business processes in a business system through a common set of well-defined technologies, methodologies, and frameworks.

SUMMARY

The technologies relate generally to a business system, and more particularly, to a system and method for creating and managing a framework for integration of multiple business processes in the business system.

In one embodiment of the present technique, a system for creating and managing a framework for integrating a plurality of business processes is disclosed. The system includes a first tier module adapted for managing at least one internal function and at least one service of the plurality of business processes, wherein each of the business processes includes predefined goals and objectives. The system further includes a second tier module adapted for managing a business initiative solution and establishing a capability to deploy and manage infrastructure based on the at least one function and at least one service of the plurality of business processes and a third tier module adapted for establishing an architecture according to the predefined goals and objectives of the plurality of business processes. Further, the system includes an integration module adapted for linking the first tier module, or the second tier module, or the third tier module, or combinations thereof for creating and managing the framework.

In another embodiment of the present technique, a method for creating and managing a framework for integrating a plurality of business processes is disclosed. The method includes identifying at least one internal function and at least one service of the plurality of business processes, wherein each business process includes predefined goals and objectives. The method also includes managing the at least one internal function and at least one service of the plurality of business processes using an organization management module based on the predefined goals and objectives of the plurality of business processes. The method further includes providing a business initiative solution based on the internal functions and services of the plurality of business processes using a delivery solution module and establishing capability to deploy and manage infrastructure using an information technology support and operation module based on the business initiative solution. Further, the method includes establishing and maintaining an architecture of the plurality of business processes using an architecture module and defining a long term strategic roadmap for the integration of the plurality of business processes using a strategy and research module. In addition to this, the method includes linking at least one of the organization management module, the delivery solution module, the information technology support and operation module, the architecture module, the strategy and research module, or combinations thereof using an integration module for creating and managing the framework.

The foregoing and other objects, features, and advantages will become more apparent from the following detailed description, which proceeds with reference to the accompanying figures.

DETAILED DESCRIPTION

While the systems and methods described herein are provided with a certain degree of specificity, the technologies can be implemented with either greater or lesser specificity, depending on the needs of the user. Further, some of the features of the technologies can be used in advantage without corresponding uses of other features described. As such, the present description should be considered merely illustrative of the principles of the technologies and not in limitation thereof.

A system and method creates and manages a framework for integrating multiple business processes. A business process is an integration of business elements interlaced together within a discipline of organization structures. Business elements may include business tasks, artifact repositories, and other processes. In certain implementations of the present technique, the business processes may include at least one of finance, manufacturing, suppliers, information technology, marketing, administration, customer support, or combinations thereof. Though reference is made to the above-mentioned business processes, many similar known processes may also be included when implementing the present technique.

With the distributed nature of information technology (IT) systems today, together with the multi-disciplined organization structure, it is essential to integrate all units of operations and system elements so that businesses may operate efficiently without becoming obstructed by IT operational limitations. If organizations manage their integration infrastructure and initiatives effectively, the organization can focus on creating high value IT assets that are completely oriented to business objectives. In order to achieve such effective integration, organizations need to adapt to specialized techniques and frameworks that may deliver the agile establishment of a scalable operational set up.

Figure 1:
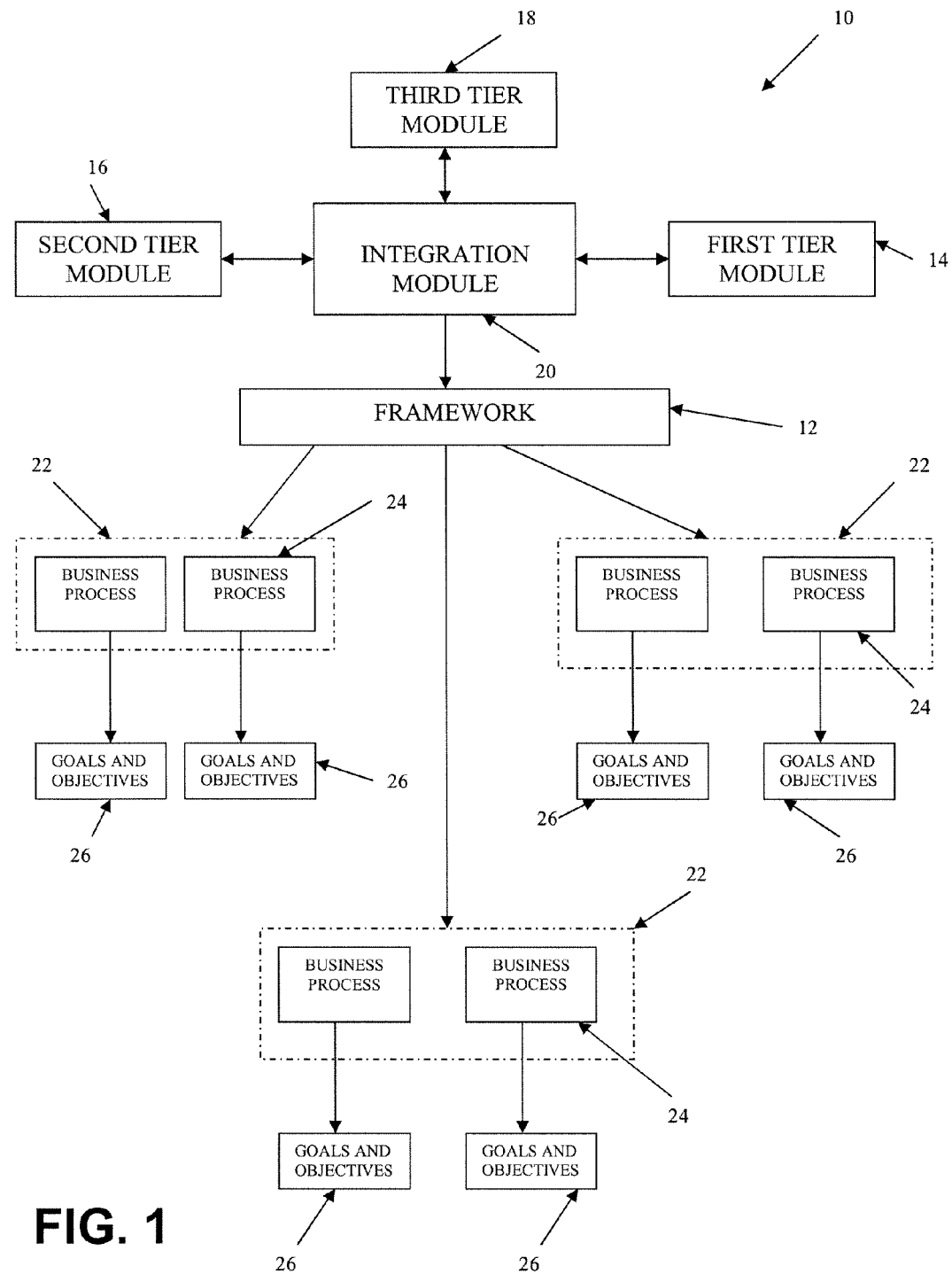
FIG. 1 is a block diagram illustrating various components of a system for creating and managing a framework for integrating a plurality of business processes.

FIG. 1 depicts a block diagram illustrating various components of the system 10 for creating and managing a framework 12 for integrating multiple business processes. As illustrated in FIG. 1, the system 10 includes a first tier module 14, a second tier module 16, and a third tier module 18. The three modules 14, 16, 18 are associated together by an integration module 20 in various combinations for creating and managing the framework 12. The system 10 further includes multiple business systems 22. The framework 12 may be used in multiple business systems 22.

The business system 22 may include various business processes 24 and sub-processes. Each business process 24 and sub-process may have a set of predefined business goals and objectives 26. Likewise, each business process 24 and sub-process may also have various internal functions and services. The term "business system" and the term "enterprise" are interchangeably used herein; the meaning of both the terms is meant to be the same.

The first tier module 14 may be adapted for managing at least one internal function and at least one service of the plurality of business processes. The second tier module 16 may be adapted for managing a business initiative solution and establishing a capability to deploy and manage infrastructure based on the at least one function and at least one service. The business initiative solution may be considered a self-contained set of integrated functionalities deployed on an information technology (IT) architecture. IT architecture may be a defined plot of systems and components that binds together the working model of an IT solution based on functional distribution of business processes across IT components.

The third tier module 18 may be adapted for establishing an architecture according to the predefined goals and objectives 26 of the multiple business processes. The framework 12 is established using the above three modules. The details of the three modules are explained in greater detail below.

The framework 12 may be defined as a set of process guidelines, indicating process improvement initiatives that the enterprise may adopt over a period of time to achieve the desired goals and objectives of the business processes.

As mentioned earlier, the integration module 20 may be adapted for integrating the first tier module 14, the second tier module 16, the third tier module 18, or combinations thereof for creating the framework 12. Further, the integration module 20 may be adapted for defining a long-term strategic roadmap for the integration of the plurality of business processes. The strategic roadmap forms a part of the framework 12 and may be delivered using predictable processes and by using effective standards.

The integration process helps multiple business systems 22 to maximize their business benefits for strategically managing elements of the enterprise integration. The framework 12 may help enterprises balance conflicting priorities and choices. In one embodiment of the present technique, the framework 12 guides the enterprise to identify elements that should be strategically managed in their business environment and helps to define specific objectives of strategic management so that integration strategies may be implemented in a realistic and objective manner. The framework 12 also helps in creating models that translate strategic objectives into execution level operations. In addition to this, in certain implementations of the present technique, the framework 12 monitors and manages effectiveness of these models that implement the strategic objectives.

Furthermore, the framework 12 organizes the required solutions for strategic management in a logical manner that addresses completeness and comprehensiveness of the framework 12. The design of the framework 12 has multiple dimensions, which may be used to define blueprints of strategic management solutions for the enterprise. Some of the dimensions may include organization management, solution delivery IT support and operations, architecture management, strategy and research, and the like. Each of these dimensions are explained in detail with reference to FIG. 2 below. Though reference is made to only the above dimensions, there are many other such similar dimensions of the framework 12 that can be used.

The framework 12 may be meant to identify a model or a set of models within a specific focus area that may serve as a logical solution to achieve objectives that are specific to the focus area. The framework 12 may also include an implementation roadmap, which deploys and adopts the model that may be used to develop a project plan.

The above framework 12 may not only be applied to any business system 22 comprising multiple business processes 24 and sub-processes, but may also be applied to multiple business systems 22, which may be located at any (e.g., different) geographical locations. The framework 12 empowers and enables the enterprise to strategically manage all dimensions of the enterprise integration initiative that enables the effective utilization and business value of integration. The framework 12 also brings specialized focus on business value driven return on investment and measures and tracks the same for an integration initiative.

Furthermore, the framework 12 can transform a low value technology oriented competency focus to a high value business integration competency focus. In addition, the framework 12 can integrate different strategies, needs, initiatives, knowledge, and investments scattered across various business systems 22 to maximize returns and provide enterprise level visibility. Also, the framework 12 can provide scalable capability to run integrated enterprise level programs for business transformation that cut across different business processes 24.

Figure 2:
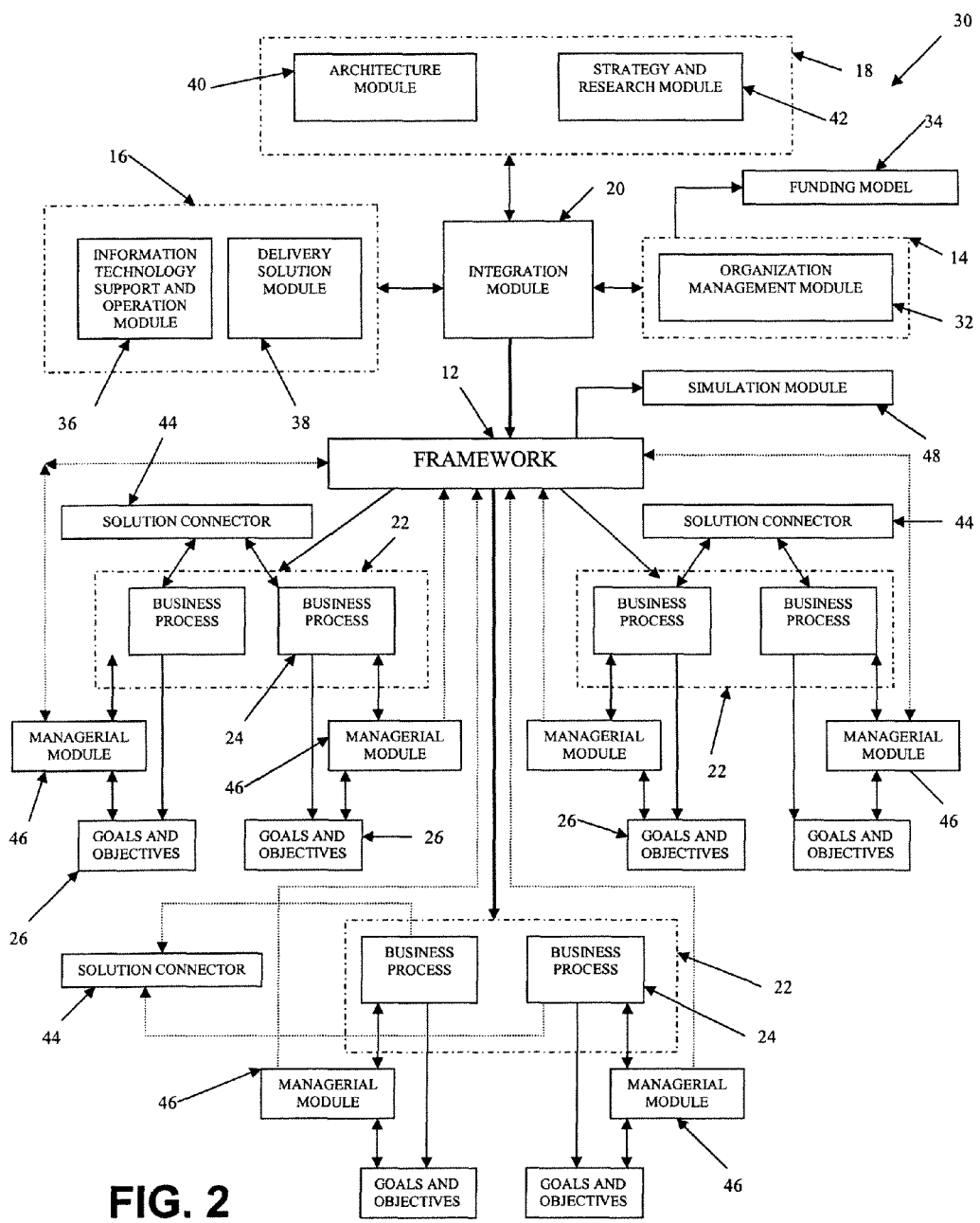
FIG. 2 is a block diagram illustrating various subcomponents of a system for creating and managing a framework for integrating a plurality of business processes.

FIG. 2 is a block diagram illustrating various subcomponents of a system 30 for creating and managing the framework 12 for integrating multiple business processes 24 in multiple business systems 22. As illustrated, the system 30 includes all the functional components as described with reference to FIG. 1, above, in addition to other functional components. However, the present discussion of FIG. 2 focuses on a detail study of the various subcomponents of the system 30.

In certain implementations of the present technique, the first tier module 14, which comprises an organization management module 32, may be adapted for developing an operational funding and governance module 34 for integrating multiple projects of the business processes 24 to achieve the predefined goals and objectives 26 of the business system 22.

The operational funding and governance model 34 may be adapted for the effective operation of the framework 12 for the business system 24.

The organization management module 32 manages the internal functions and other common organizational services required to support various initiatives. In one embodiment of the present technique, the organization management module 32 may be adapted to analyze potential problems of the business processes 24 based on the at least one internal function and at least one service of the multiple business processes 24.

In another embodiment of the present technique, the organization management module 32 defines the business process roles, responsibilities and functional structure. It also defines and establishes the operational funding and governance model 34 for integrating projects and measuring benefits to demonstrate business benefit. Further it develops and manages organizational change management and communication initiatives for stakeholders. In yet another embodiment of the present technique, the organization management module 32 may manage the enterprise engagement initiation and on-going interactions between stakeholders for the projects' life cycles.

The system 30 further includes the second tier module 16, which includes two sub-modules. The first sub-module may be referred to as an information technology support and operation module 36 adapted to provide specified service levels to the plurality of projects for the plurality of business processes. In one embodiment of the present technique, the information technology support and operation module 36 provides a standard guideline to monitor and manage enterprise production environment and incidents. In addition, in certain implementations of the present technique, the module 36 provides a standard operating environment and also provides a process to track the enterprise inventory and software licenses. In yet another embodiment of the present technique, the information technology support and operation module 36 provides capacity planning for enterprise environments and verification of capacity estimates executed by projects and also develops standard procedures and tools during deployment for acceptance and handover from an enterprise development team.

The system 30 further includes another sub-module in the information technology support module referred to as a delivery solution model 38. The delivery solution module 38 can establish the capability of providing business solution initiatives for delivery solutions for the enterprise. In certain implementations of the present technique, the delivery solution module 38 assesses business initiatives for feasibility/applicability and process improvement. It also establishes and governs standard processes and methodologies (e.g., requirements, design, build, test, deploy). In another embodiment of the present technique, the delivery solution module 38 develops and manages standard tools for development, testing, and deployment. It can also manage enterprise resources, cost, and project timelines. In yet another embodiment of the present technique, the delivery solution module 38 manages software versions and project releases for software in a production environment and also conducts quality audits and quality improvement initiatives for the enterprise.

The third tier module 18 of the system 30 includes an architecture management module 40 adapted for providing an architecture and technological governance for creating and managing the framework 12 for integrating multiple business processes. In certain implementations of the present technique, the architecture management module 40 establishes, governs, and maintains the enterprise reference architecture and develops and manages the common framework 12 for implementing consistent and scalable integration solutions for the business system. In one embodiment of the present technique, the architecture management module 40 defines the knowledge management framework and establishes an integration repository and also promotes reuse of the same. It also manages metadata, common components, and message repositories for the enterprise. In another embodiment of the present technique, the architecture management module 40 supports projects to implement architecture standards and guidelines. In yet another embodiment of the present technique, the module 40 provides an architecture and overall technological governance for integration solutions. This guides the enterprise to implement the framework.

The third tier module 18 of the system 30 further includes a strategy and research module 42 adapted for aligning the framework with the predefined goals and objectives. In certain implementations of the present technique, the strategy and research module 42 aligns the integration vision with business goals and objectives and defines an integration strategy to encompass people, process, and technology dimensions of the enterprise. In addition, in one embodiment of the present technique, the strategy and research module 42 identifies and selects the right technical platform, product, or both. In another embodiment of the present technique, the strategy and research module 42 defines the long term strategic roadmap for enterprise integration.

The system 30 further includes at least one solution connector 44 adapted for transforming data and interfacing with multiple business processes 24. Data in an organizational context may be defined as a set of information closely tied to business elements that may be required to be exchanged and flowed between multiple business process activities. In one embodiment of the present technique, business elements can be a customer, order, invoice, or the like.

The system 30 further includes at least one managerial module 46 adapted to monitor performance of each of the business processes 24 after implementation of the framework 12 and provide modification of the framework 12 based on the performance. In one embodiment of the present technique, the managerial module 46 determines the performance of the business processes 24 based on the implementation of the framework 12 and then provides feedback for improvement. Based on the feedback, the framework 12 may be altered to cater to the requirements of the business processes.

Furthermore, the system 30 includes a simulation module 48 adapted for simulating the framework 12 prior to the implementation of the framework 12. The simulation module 48 provides a snapshot to at least one user to determine the usefulness of implementing the framework 12 for any business process 24. In certain implementations of the present technique, the snapshot may be in the form of a graphical user interface, usually considering a hypothetical situation of any enterprise. However, actual situations may also be simulated using the present technique. In addition to this, though reference is made to the graphical user interface, any method of simulation may be implemented in the present technique in addition to or in place of the graphical user interface.

Figure 3:
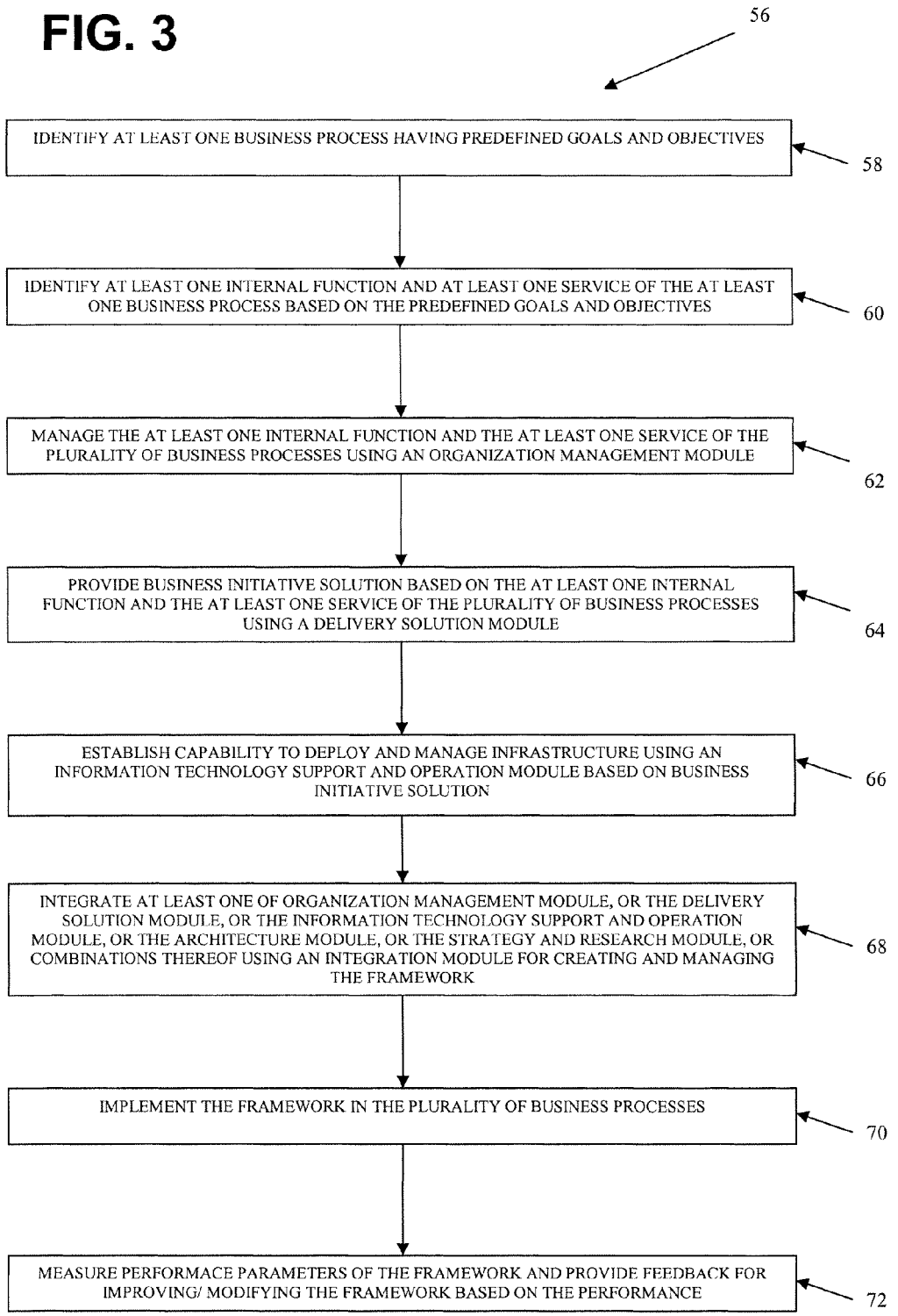
FIG. 3 is a flowchart illustrating a method for creating and managing a framework for integrating a plurality of business processes.

FIG. 3 is a flowchart illustrating a method 56 for creating and managing a framework for integrating a plurality of business processes, in accordance with an aspect of the present technique. The method starts at 58 with identifying at least one business process having the predefined goals and objectives of each of the business processes. At 60, at least one internal function and at least one service of the at least one business process may be identified. At 62, the at least one internal function and at least one service may be managed using the organization management module. In one embodiment of the present technique, the organization management module may be adapted to analyze potential problems of the business processes based on the at least one internal function and at least one service of the multiple business processes.

The method further includes providing a business initiative solution based on the at least one internal function and at least one service using the delivery solution module at 64. At 66, the capability to deploy and manage infrastructure may be established using the information technology support and operation module. This capability can be based on the business initiative solution. The method further includes establishing and maintaining an architecture of the at least one business process using an architecture module. The architecture module can provide a reference model that may be used to predictably build the business initiative solution and has a standardized and proven framework of components.

Further, a long term strategic roadmap for the integration of the at least one business process may be defined using a strategy and research module. The strategic roadmap may consist of ordered strategic objectives defined on a qualitative time scale that defines the progressive accomplishment of the objectives.

The method continues at 68 by linking at least one of the organization management module, the delivery solution module, the information technology support and operation module, the architecture module, the strategy and research module, or combinations thereof using an integration module for creating and managing the framework for integrating the at least one business process.

The method further includes implementing the framework to the various business processes at 70. As described earlier in detail, the framework may be used in multiple business systems or enterprises, having at least one business process. Finally, at step 72, the results of the implementation of the roadmap is monitored and based on the results of the implementation, feedback may be provided for improving or modifying the framework.

Example

Exemplary Implementation of Technologies

The following exemplary example provides details on a process involved in an exemplary implementation of the framework.

By way of example, a client is a leading telecommunications company. The client has a federated IT structure and had already implemented various process integration projects for its business system. Despite the projects, the client's competency had been in a reactive state only, so true benefits of integration initiatives had not been realized to their full potential. Some of the requirements of the client were economies of scale, integration implementation, reduction of total cost of ownership for integration, improvement of quality of integration implementation, and development of a long-term view of integration. In addition, the requirements included removing redundancy in the integration components and services and establishing uniform standards for developing and maintaining the integration components. Further, the requirements included enhancing reusability of integration components by moving towards a service-oriented architecture using the integration initiatives and removing point-to-point interfaces. Moreover, the requirements included bringing standardization, consistency, and governance into integration-related initiatives and removing unsupported and non-strategic technology elements.

In order to achieve the above requirements of the client, a team initially conducted a five-week study to frame a blueprint of the framework for the various business processes of the organization. The work included a blueprint of a roadmap for the existing integration group to be transformed into the new framework. The solution proposed to the client was to run the framework like an independent entity offering a set of services to various business systems and business processes and maintaining service level agreements with them.

Some of the recommendations made were to setup a division responsible for end-to-end execution of the framework within client business systems, empower the center by creating a quasi-infrastructure funding module and monitoring performance on well-defined metrics through a strong governance mechanism, create a joint client-vendor organization with the requisite skills and establish robust processes and tools to build strong framework execution capabilities, build critical mass components that may be used by business initiatives in the near term, expand the scope of the new division to include all application integration technologies to create an advanced level framework, build capabilities to offer the complete range of framework services in an aggressive timeframe of nine to twelve months with well-defined milestones, and become a central provider of services for all current and future application integration technologies.

Some of the key benefits achieved were enterprise level governance by establishing the framework as a domain and setting direct connection between business objectives and integration solutions as well as well-defined integration services to internal stake holders and focus on the business benefit to the client. Other benefits included maximized opportunities for reuse and hence a shortened development life-cycle and optimized development and production support services to reduce the total cost of ownership. A further benefit was improved operational efficiency and reduced complexity in framework management allowing the client to spend more bandwidth on strategic evolution.

Example

Exemplary Implementation in Processor-Based System Environment

The foregoing examples, demonstrations, and methods may be implemented by suitable code on a processor-based system, such as a general purpose or special purpose computer. Different implementations of the present technique may perform some or all of the actions described herein in a different order or substantially concurrently (i.e., in parallel). Furthermore, the functions may be implemented in a variety of programming languages. Such code may comprise computer-readable instructions stored or adapted for storage in more or more tangible machine readable media, such as on memory chips, local or remote hard disks, optical disks, or other media, which may be accessed by a process-based system to execute the stored code.

The sequence of instructions as explained in the methods may include program code adapted for identifying at least one internal function and at least one service of the plurality of business processes, wherein business processes include respective predefined goals and objectives. The instructions can further include program code adapted for managing at least one internal function and at least one service of the at least one business process and program code adapted for providing a business initiative solution based on the at least one internal function and at least one service of the at least one business process. The sequence of instructions may further include program code adapted for establishing a capability to deploy and manage infrastructure based on the business initiative solution and program code adapted for establishing and maintaining an architecture of the at least one business process. The instructions can further include program code adapted for defining the long-term strategic roadmap for the integration of the business processes and program code adapted for linking at least one of one of the above program codes or combinations thereof for creating and managing the framework for integrating multiple business processes.

In one embodiment of the present technique, the sequence of instructions may include program code adapted for developing, testing, and deployment of the framework for the business processes. In another embodiment of the present technique, the sequence of instructions may include program code adapted for providing an architecture and technological governance for creating the framework for integrating the business processes. In yet another embodiment of the present technique, the sequence of instructions may include program code adapted for transforming data and interfacing with multiple business systems. Furthermore, the sequence of instructions may also include program code adapted for simulating the framework for integrating the multiple business processes.

Example

Exemplary Advantages

The various implementations of the present technique can provide a variety of advantages. For example, the framework may provide a business-objective-drive integration environment, thus making the enterprise boundary-less. The techniques may also increase visibility and enable faster decision making for the enterprise. The techniques may also integrate a business process view and economies of scale because of repeatable infrastructure and productivity gains. In addition, the framework provides scalable and well-managed solutions for increased efficiency and performance.

Furthermore, by using the framework, an enterprise de-risks the current and future investments. In an implementation of the present technique, the framework provides higher resource utilization due to shared services and a common resource pool and also helps in creased reuse of components due to knowledge sharing and standards-based development.

Example

Exemplary Computing Environment

Figure 4:
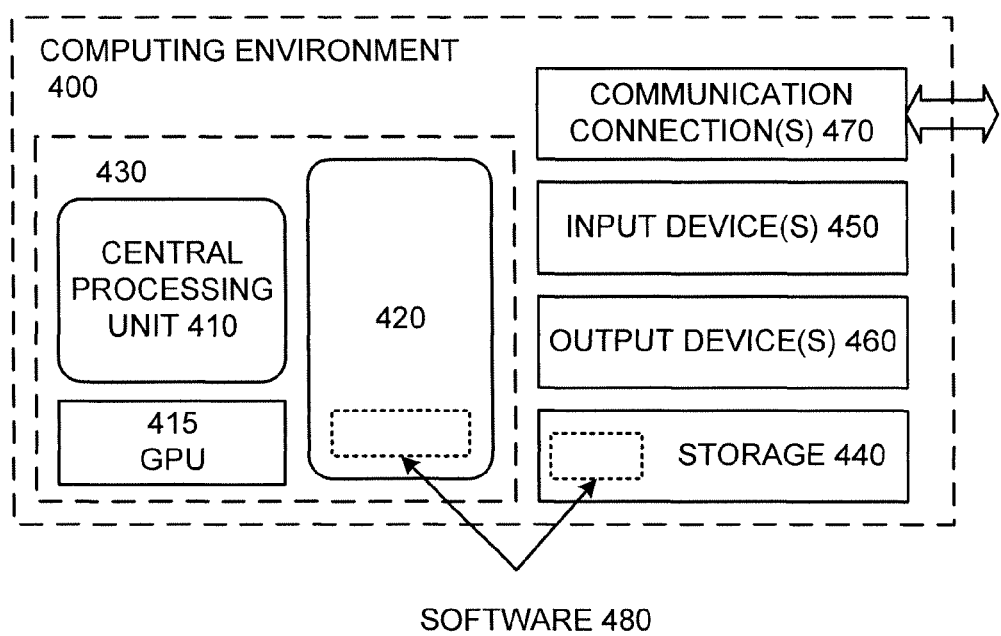
FIG. 4 is a block diagram of a suitable computing environment in which the described techniques can be implemented.

FIG. 4 illustrates a generalized example of a suitable computing environment 400 in which the described techniques can be implemented. The computing environment 400 is not intended to suggest any limitation as to scope of use or functionality, as the technologies may be implemented in diverse general-purpose or special-purpose computing environments.

With reference to FIG. 4, the computing environment 400 includes at least one processing unit 410 and memory 420. In FIG. 4, this most basic configuration 430 is included within a dashed line. The processing unit 410 executes computer-executable instructions and may be a real or a virtual processor. In a multi-processing system, multiple processing units execute computer-executable instructions to increase processing power. The memory 420 may be volatile memory (e.g., registers, cache, RAM), non-volatile memory (e.g., ROM, EEPROM, flash memory, etc.), or some combination of the two. The memory 420 can store software 480 implementing any of the technologies described herein.

A computing environment may have additional features. For example, the computing environment 400 includes storage 440, one or more input devices 450, one or more output devices 460, and one or more communication connections 470. An interconnection mechanism (not shown) such as a bus, controller, or network interconnects the components of the computing environment 400. Typically, operating system software (not shown) provides an operating environment for other software executing in the computing environment 400, and coordinates activities of the components of the computing environment 400.

The storage 440 may be removable or non-removable, and includes magnetic disks, magnetic tapes or cassettes, CD-ROMs, CD-RWs, DVDs, or any other computer-readable media which can be used to store information and which can be accessed within the computing environment 400. The storage 440 can store software 480 containing instructions for any of the technologies described herein.

The input device(s) 450 may be a touch input device such as a keyboard, mouse, pen, or trackball, a voice input device, a scanning device, or another device that provides input to the computing environment 400. For audio, the input device(s) 450 may be a sound card or similar device that accepts audio input in analog or digital form, or a CD-ROM reader that provides audio samples to the computing environment. The output device(s) 460 may be a display, printer, speaker, CD-writer, or another device that provides output from the computing environment 400.

The communication connection(s) 470 enable communication over a communication medium to another computing entity. The communication medium conveys information such as computer-executable instructions, audio/video or other media information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Communication media can embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. Communication media include wired media such as a wired network or direct-wired connection, and wireless media such as acoustic, RF, infrared and other wireless media. Combinations of any of the above can also be included within the scope of computer readable media.

The techniques herein can be described in the general context of computer-executable instructions, such as those included in program modules, being executed in a computing environment on a target real or virtual processor. Generally, program modules include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing environment.

Methods in Computer-Readable Media

Any of the methods described herein can be implemented by computer-executable instructions in one or more computer-readable media (e.g., computer-readable storage media).

Alternatives

Various modifications to the described implementations can be implemented and the generic principles of the techniques described herein may be employed to other embodiments, and some features may be used without the corresponding use of other features.

For any description herein of integrating one or more modules, two or more of the modules can be integrated.

The technologies from any implementation can be combined with the technologies described in any one or more of the other implementations. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of these claims.

We claim:

1. One or more non-transitory computer-readable storage media having computer-executable instructions for performing a method of creating and managing a framework for integrating a plurality of business processes, the method comprising:

identifying at least one internal function and at least one service of the plurality of business processes of an enterprise, wherein business processes includes respective predefined goals and objectives;

managing the at least one internal function and the at least one service of the plurality of business processes using an organization management module based on the predefined goals and objectives of the plurality of business processes, wherein the organization management module interfaces with an operational funding and governance model for integrating projects of the plurality of business processes and measuring benefits;

wherein the organization management module manages organizational change management and communication initiatives and analyzes potential problems of the plurality of business processes based on the at least one internal function and the at least one service;

providing a business initiative solution based on the at least one internal function and the at least one service of the plurality of business processes using a delivery solution module, wherein the delivery solution module assesses business initiatives for applicability and process improvement and conducts quality audits and quality improvements for the enterprise;

wherein the delivery solution module manages enterprise resources, project timelines, and software versions and project releases for software;

establishing a capability to deploy and manage infrastructure using an information technology support and operation module based on the business initiative solution, the information technology support and operation module providing a process to track inventory and software licenses;

wherein the information technology support and operation module further provides specified service levels to the projects of the plurality of business processes, provides a standard guideline to monitor and manage enterprise production environment and incidents, and provides verification of capacity estimates executed for the projects;

establishing and maintaining an architecture of the plurality of business processes using an architecture module, wherein the architecture module provides a reference model that is used to build the business initiative solution, and wherein the architecture module establishes an integration repository and manages message repositories for the enterprise;

with one or more solution connectors, interfacing with a plurality of the plurality of business processes and transforming data therebetween;

defining a long term strategic roadmap for integration of the plurality of business processes using a strategy and research module, the strategy and research module defines an integration strategy to encompass at least a people dimension, a process dimension, and a technology dimension of the enterprise;

monitoring performance of the plurality of business processes after implementation of the framework and providing modification of the framework based on the performance, wherein modification of the framework comprises modification of at least one module selected from the group consisting of the organization management module, the delivery solution module, the information technology support and operation module, the architecture module, and the strategy and research module; and integrating the information technology support and operation module, the organization management module, the strategy and research module, and at least one selected from the group consisting of the following or combinations thereof using an integration module for creating and managing the framework:

the delivery solution module and the architecture module.

2. The one or more non-transitory computer-readable storage media as recited in claim 1, wherein the information technology support and operation module is adapted to provide tools and procedures during deployment and management of the architecture.

3. The one or more non-transitory computer-readable storage media as recited in claim 1, wherein the plurality of business processes comprising at least one chosen from the group consisting of:

finance, manufacturing, suppliers, information technology, marketing, administration, and customer support.

4. The one or more non-transitory computer-readable storage media as recited in claim 1, wherein the method further comprises:

simulating the framework for integrating the plurality of business processes.

5. A system for creating and managing a framework for integrating a plurality of business processes, comprising:

at least one processing unit;

memory coupled to the at least one processing unit;

a first tier module adapted for managing at least one internal function and at least one service of the plurality of business processes of an enterprise, wherein the plurality of the business processes includes predefined goals and objectives;

a second tier module adapted for managing business initiative solutions and establishing a capability to deploy and manage infrastructure based on the at least one internal function and at least one service of the plurality of business processes;

a third tier module adapted for establishing an architecture according to the predefined goals and objectives of the plurality of business processes;

at least one solution connector adapted for transforming data and interfacing with the plurality of business processes;

at least one managerial module, wherein the at least one managerial module is adapted to monitor performance of the plurality of business processes after implementation of the framework and provide modification of the framework based on the performance, wherein the modification of the framework comprises modifying at least one module selected from the group consisting of the first tier module, the second tier module and the third tier module; and an integration module adapted for associating the first tier module comprising an organizational management module, the second tier module comprising an information technology support and operation module and a delivery solution module, and the third tier module comprising a strategy and research module and an architecture management module for creating and managing the framework, the information technology support and operation module providing a process to track inventory and software licenses;

wherein the information technology support and operation module further provides specified service levels to projects of the plurality of business processes, provides a standard guideline to monitor and manage enterprise production environment and incidents, and provides verification of capacity estimates executed for the projects;

wherein the delivery solution module provides a business initiative solution based on the at least one internal function and the at least one service of the plurality of business processes, and wherein the delivery solution module assesses business initiatives for applicability and process improvement and conducts quality audits and quality improvements for the enterprise;

wherein the delivery solution module further manages enterprise resources, project timelines, and software versions and project releases for software;

wherein the architecture management module provides a reference model that is used to build the business initiative solution, establishes an integration repository, and manages message repositories for the enterprise;

wherein the strategy and research module defines a long term strategic roadmap for integration of the plurality of business processes and defines an integration strategy to encompass at least a people dimension, a process dimension, and a technology dimension of the enterprise;

wherein the organization management module interfaces with an operational funding and governance model for measuring benefits and integrating the projects of the plurality of business processes to achieve the predefined goals and objectives; and wherein the organization management module manages organizational change management and communication initiatives and analyzes potential problems of the plurality of business processes based on the at least one internal function and the at least one service.

6. The system as recited in claim 5, wherein the second tier module comprises the delivery solution module adapted for developing, testing and deployment of the framework for the plurality of business processes.

7. The system as recited in claim 5, wherein the plurality of business processes comprises one or more sub-processes having predefined goals and objectives.

8. The system as recited in claim 5, wherein the third tier module comprises the architecture management module adapted for providing the architecture and technological governance for creating and managing the framework.

9. The system as recited in claim 5, wherein the third tier module further comprises the strategy and research module adapted for aligning the framework with the predefined goals and objectives.

10. The system as recited in claim 5, further comprising a simulation module adapted for simulating the framework prior to the implementation of the framework.

11. The system as recited in claim 5, wherein the framework is adapted to integrate the plurality of business processes at various geographical locations.

12. The system as recited in claim 5, wherein the plurality of business processes comprises at least one of finance, or manufacturing, or suppliers, or information technology, or marketing, or administration or customer support, or combinations thereof.

13. One or more non transitory computer-readable storage media having computer-executable instructions for performing a method of creating and managing a framework for integrating a plurality of business processes, the method comprising:

identifying at least one internal function and at least one service of the plurality of business processes of an enterprise, wherein business processes includes respective predefined goals and objectives;

managing the at least one internal function and the at least one service of the plurality of business processes using an organization management module based on the predefined goals and objectives of the plurality of business processes;

wherein the organization management module interfaces with an operational funding and governance model for integrating projects of the plurality of business processes and measuring benefits;

wherein the organization management module analyzes potential problems of the plurality of business processes based on the at least one internal function and at least one service;

wherein the organization management module manages organizational change management and communication initiatives for stakeholders;

wherein the organization management module further manages an enterprise engagement initiation and interactions between the stakeholders for life cycles of the projects;

providing a business initiative solution based on the at least one internal function and the at least one service of the plurality of business processes using a delivery solution module, wherein the delivery solution module assesses business initiatives for applicability and process improvement;

wherein the delivery solution module further manages enterprise resources, project timelines, and software versions and project releases for software;

wherein the delivery solution module conducts quality audits and quality improvements for the enterprise;

establishing a capability to deploy and manage infrastructure using an information technology support and operation module based on the business initiative solution;

wherein the information technology support and operation module provides specified service levels to the projects of the plurality of business processes;

wherein the information technology support and operation module further provides a standard operating environment and a process to track inventory and software licenses;

wherein the information technology support and operation module further provides a standard guideline to monitor and manage enterprise production environment and incidents;

wherein the information technology support and operation module further provides verification of capacity estimates executed for the projects;

establishing and maintaining an architecture of the plurality of business processes using an architecture module, wherein the architecture module provides a reference model that is used to build the business initiative solution;

wherein the architecture module establishes an integration repository, and manages message repositories for the enterprise;

with one or more solution connectors, interfacing with a plurality of the plurality of business processes and transforming data therebetween;

defining a long term strategic roadmap for integration of the plurality of business processes using a strategy and research module, the strategy and research module defines an integration strategy to encompass at least a people dimension, a process dimension, and a technology dimension of the enterprise, and wherein the strategy and research module selects a technical platform;

integrating the organization management module, the delivery solution module, the information technology support and operation module, the architecture module, and the strategy and research module for creating and managing the framework; and simulating the framework prior to the implementation of the framework using a simulation module, the simulation module providing a snapshot in a graphical user interface.

14. A method of creating and managing a framework for integrating a plurality of business processes implemented at least in part using a computer, the method comprising:

identifying, using a computer, at least one internal function and at least one service of the plurality of business processes of an enterprise, wherein business processes includes respective predefined goals and objectives;

managing, using a computer, the at least one internal function and the at least one service of the plurality of business processes using an organization management module based on the predefined goals and objectives of the plurality of business processes, wherein the organization management module interfaces with an operational funding and governance model for integrating projects of the plurality of business processes and measuring benefits;

wherein the organization management module manages organizational change management and communication initiatives and analyzes potential problems of the plurality of business processes based on the at least one internal function and the at least one service;

providing a business initiative solution based on the at least one internal function and the at least one service of the plurality of business processes using a delivery solution module, wherein the delivery solution module assesses business initiatives for applicability and process improvement and conducts quality audits and quality improvements for the enterprise;

wherein the delivery solution module manages enterprise resources, project timelines, and software versions and project releases for software;

establishing a capability to deploy and manage infrastructure using an information technology support and operation module based on the business initiative solution, the information technology support and operation module providing a process to track inventory and software licenses;

wherein the information technology support and operation module further provides specified service levels to the projects of the plurality of business processes, provides a standard guideline to monitor and manage enterprise production environment and incidents, and provides verification of capacity estimates executed for the projects;

establishing and maintaining an architecture of the plurality of business processes using an architecture module, wherein the architecture module provides a reference model that is used to build the business initiative solution, and wherein the architecture module establishes an integration repository and manages message repositories for the enterprise;

with one or more solution connectors, interfacing with a plurality of the plurality of business processes and transforming data there between;

defining a long term strategic roadmap for integration of the plurality of business processes using a strategy and research module, the strategy and research module defines an integration strategy to encompass at least a people dimension, a process dimension, and a technology dimension of the enterprise;

monitoring performance of the plurality of business processes after implementation of the framework and providing modification of the framework based on the performance, wherein modification of the framework comprises modification of at least one module selected from the group consisting of the organization management module, the delivery solution module, the information technology support and operation module, the architecture module, and the strategy and research module; and integrating the information technology support and operation module, the organization management module, the strategy and research module, and at least one selected from the group consisting of the following or combinations thereof using an integration module for creating and managing the framework:

the delivery solution module and the architecture module.

* * * * *